No. 884,888. PATENTED APR. 14, 1908.
A. P. BELLOWS.
SQUIRREL EXTERMINATOR.
APPLICATION FILED JULY 23, 1907.

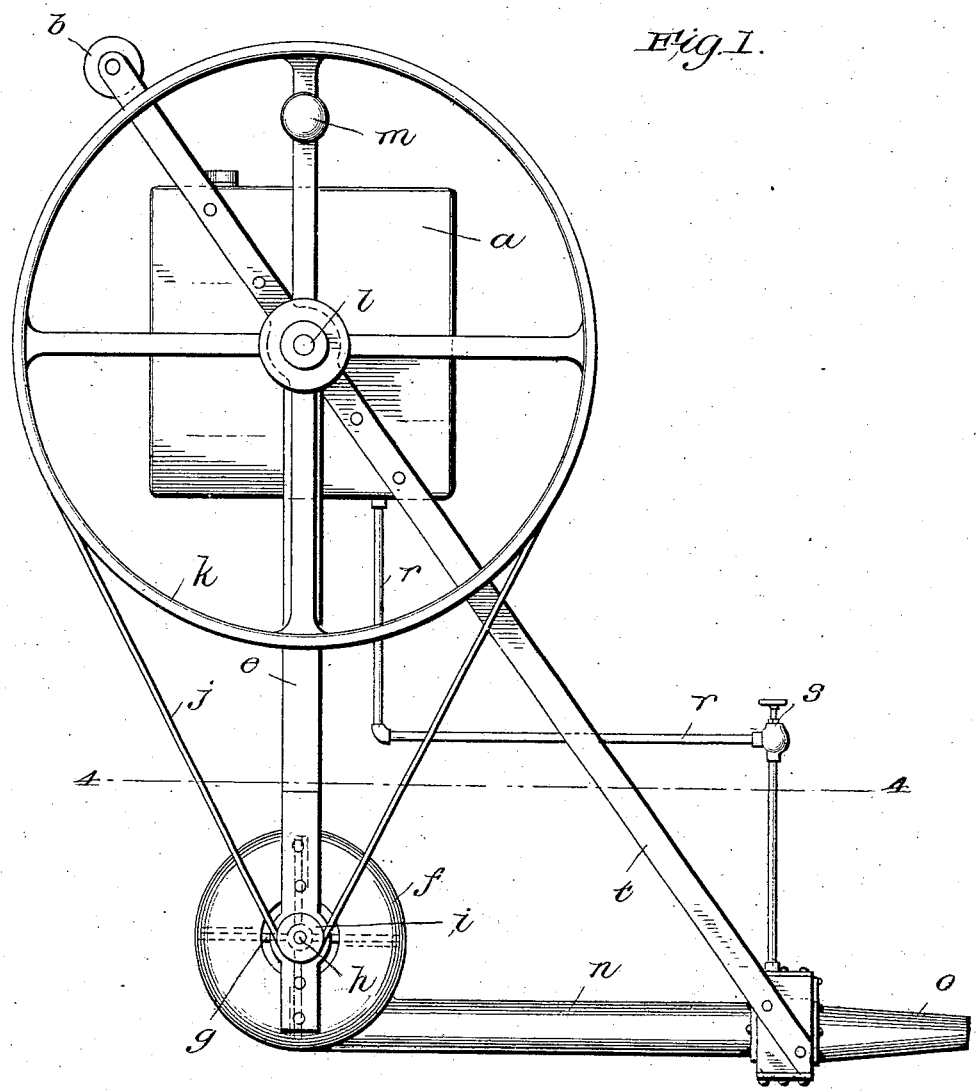
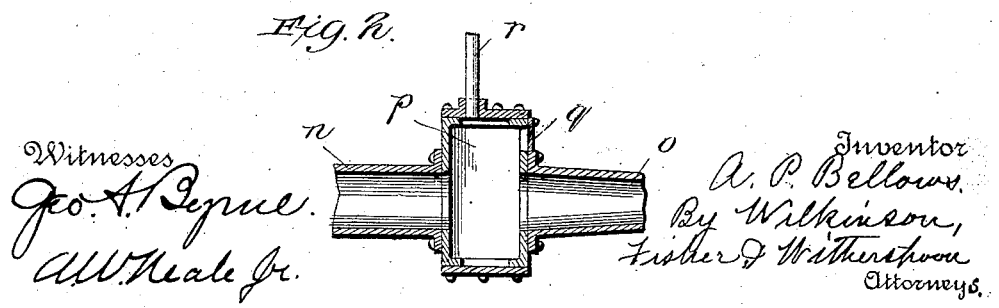

2 SHEETS—SHEET 2.

UNITED STATES PATENT OFFICE.

ALBERT PARSONS BELLOWS, OF PORTERSVILLE, CALIFORNIA.

SQUIRREL-EXTERMINATOR.

No. 884,888.        Specification of Letters Patent.        Patented April 14, 1908.

Application filed July 23, 1907. Serial No. 385,103.

*To all whom it may concern:*

Be it known that I, ALBERT PARSONS BELLOWS, a citizen of United States, residing at Portersville, in the county of Tulare and State of California, have invented certain new and useful Improvements in Squirrel-Exterminators; and I do hereby declare the following to be a full, clear, and exact description of the invention, such as will enable others skilled in the art to which it appertains to make and use the same.

My invention relates to improvements in squirrel exterminators, although it may also be used for the killing of other small animals and vermin.

The object of my invention is to provide a simple means, whereby squirrels and similar objectionable pests may be destroyed by forcing a hot poisonous gaseous mixture into their holes or hiding places.

With this object in view, my invention consists in the construction and combinations of parts as hereinafter described and claimed.

Figure 3:
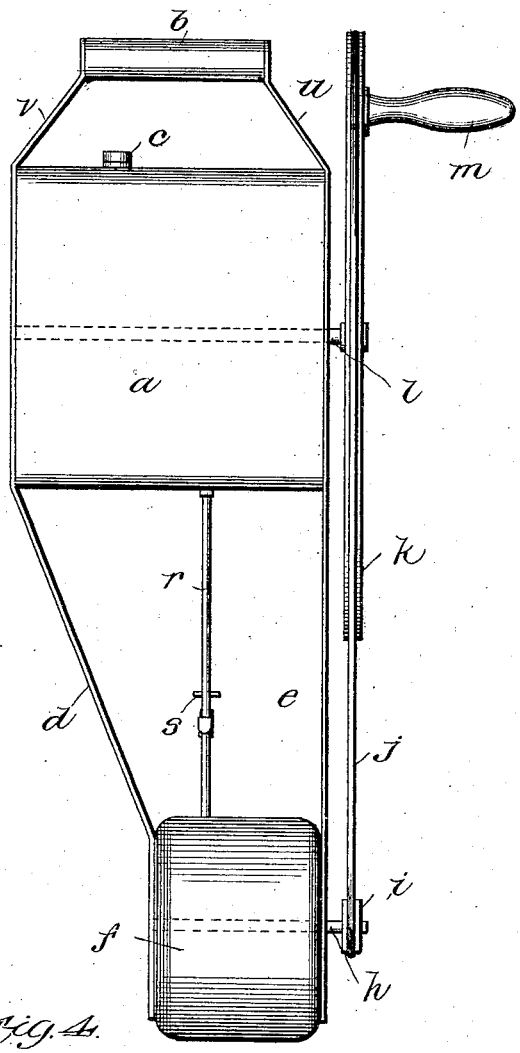
Figure 4:
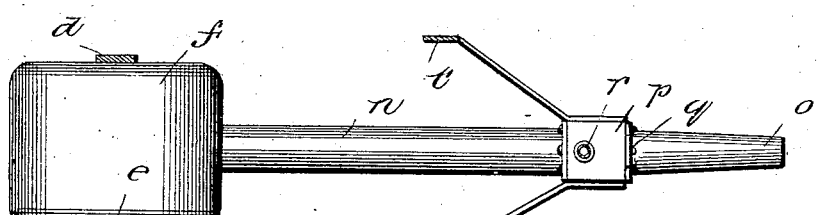

In the accompanying drawings—Figure 1 is a side view of my invention. Fig. 2 is a cross section on an enlarged scale of the mixing chamber and connected parts. Fig. 3 is an end view of my invention, and Fig. 4 is a section thereof on the line 4—4 of Fig. 1.

The device is adapted to be carried from place to place by hand, and it consists of a tank $a$, provided with a handle $b$, and with a filling orifice provided with a removable cap $c$. In the tank $a$, a mixture of crude oil, coal tar and potassium cyanid is placed.

Braces $d$ and $e$ are attached to the sides of the tank $a$, extending downwardly and being fastened to and supporting the casing $f$ of a fan blower which is provided with blades $g$. This fan blower is of any desired type. The fan blower is mounted upon a shaft $h$ projecting out through the casing $f$, and is provided with a pulley $i$, around which passes a band $j$, which band also passes around the driving wheel $k$, which is mounted on the shaft $l$, which passes through the tank $a$, and which wheel is provided with an operating handle or crank $m$.

The air drawn into the casing $f$ by the fan is driven out by said fan through a discharge pipe $n$ of considerable length, and which preferably terminates in a conical portion $o$.

The pipes $n$ and $o$ are made in separate portions, and are joined together by means of a mixing chamber $p$, to the opposite sides of which said pipes are bolted or otherwise secured. This mixing chamber is considerably larger than its pipe connections, and is provided with a swinging damper $q$.

A pipe $r$, provided with a cut-off valve $s$, extends from the tank $a$ into the mixing chamber $p$.

A diagonal brace $t$ is fastened to the tank and to the air chamber for the purpose of holding the parts in their proper relative position. The lower end of this brace is fastened to the air chamber, and said brace is secured near its upper end to the sides of the tank $a$, extending upwardly, as shown at $u$, to the handle $b$. Similarly the brace $d$ extends upwardly, as shown at $v$, to engage said handle, the whole forming a very strong, light and compact structure.

The operation is as follows:—The valve $s$ is opened, and a portion of the mixture contained in the tank $a$ descends into the mixing chamber $p$. The damper $q$ is then opened, and the oily mixture which is in the bottom of the mixing chamber $p$ is ignited by any suitable means. The pipe $o$ is then inserted into the squirrel hole, and the hand-wheel $k$ operated. This blows a hot poisonous gaseous mixture into the squirrel hole, to the influence of which the animal soon succumbs.

Having thus described my invention, what I claim as new, and desire to secure by Letters Patent, is:—

1. A portable squirrel exterminator, comprising a supporting frame provided with a handle, a tank and blower carried by said frame, means for operating said blower by hand, a delivery pipe provided with a chamber, said pipe leading from the blower casing and a valved connecting pipe leading from said tank into said chamber, substantially as described.

2. A portable squirrel exterminator, including a tank provided with a handle, a fan blower provided with a delivery pipe, a mixing chamber connected with said delivery pipe, a valved pipe connecting said tank and said mixing chamber, means carried by said tank for operating said fan blower, and braces for securing the structure together, substantially as described.

3. A portable squirrel exterminator, comprising a tank adapted to carry a poisonous mixture, a fan blower provided with a delivery pipe, a hand-wheel supported on said tank, means operated by said hand-wheel for operating said fan blower, a mixing chamber provided with a damper located in said delivery pipe, a valved pipe connecting said tank and said mixing chamber, and braces for securing the whole structure together, said braces extending upwardly and terminating in a handle, substantially as described.

In testimony whereof, I affix my signature, in presence of two witnesses.

ALBERT PARSONS BELLOWS.

Witnesses:
GEO. D. AVERY,
CHARLES ANTON NIEMAN.